(12) United States Patent
Vaughn

(10) Patent No.: US 6,561,595 B2
(45) Date of Patent: May 13, 2003

(54) BRAKE ASSEMBLY, SYSTEM AND METHOD

(75) Inventor: Lawrence E. Vaughn, Watertown, NY (US)

(73) Assignee: New York Air Brake Corporation, Watertown, NY (US)

( * ) Notice: Subject to any disclaimer, the term of this patent is extended or adjusted under 35 U.S.C. 154(b) by 0 days.

(21) Appl. No.: 09/892,610

(22) Filed: Jun. 28, 2001

(65) Prior Publication Data

US 2003/0001431 A1 Jan. 2, 2003

(51) Int. Cl.$^7$ ............................................. B60T 13/00
(52) U.S. Cl. .................... 303/22.5; 303/22.1; 303/22.7; 303/9.69
(58) Field of Search ................. 303/9.69, 22.1–22.8

(56) References Cited

U.S. PATENT DOCUMENTS

| | | | | |
|---|---|---|---|---|
| 3,730,597 A | * | 5/1973 | Pickert | 303/22.5 |
| 3,890,013 A | * | 6/1975 | Coiner | 303/22.5 |
| 3,910,639 A | | 10/1975 | Engle | |
| 4,080,005 A | * | 3/1978 | Engle | 303/22.5 |
| 4,417,767 A | * | 11/1983 | Billeter | 303/22.1 |
| 4,453,777 A | * | 6/1984 | Newton | 303/22.2 |
| 4,598,953 A | | 7/1986 | Wood et al. | |
| 5,211,450 A | | 5/1993 | Gayfer et al. | |
| 5,303,987 A | * | 4/1994 | McKay | 303/22.2 |
| 5,458,403 A | * | 10/1995 | Moody | 303/7 |
| 5,494,342 A | | 2/1996 | Engle | |

\* cited by examiner

Primary Examiner—Matthew C. Graham
(74) Attorney, Agent, or Firm—Barnes & Thornburg

(57) ABSTRACT

The present invention relates to a brake assembly for a vehicle having an air spring wherein a brake signal operates a brake cylinder of the vehicle. A proportioning valve, having its load responsive element disabled and being responsive to the brake signal, provides a proportioned brake signal to the brake cylinder. A switch, responsive to an air spring pressure signal selectively connects the brake signal to the brake cylinder. The present invention further relates to a method for retrofitting a brake system by disabling the load sensing element of a proportioning valve and inserting a switch in parallel with the proportioning valve.

16 Claims, 2 Drawing Sheets

BRAKE ASSEMBLY, SYSTEM AND METHOD

BACKGROUND AND SUMMARY OF THE INVENTION

The present invention relates to a brake assembly for a vehicle having a fluid suspension wherein a brake signal operates a brake cylinder of the vehicle. A proportioning valve, having its load responsive element disabled and being responsive to the brake signal, provides a proportioned brake signal to the brake cylinder. A switch, responsive to an air spring pressure signal selectively connects the brake signal to the brake cylinder. The present invention further relates to a method for retrofitting a brake system by disabling the load sensing element of a proportioning valve and inserting a switch in parallel with the proportioning valve.

In a rail brake system, a control valve monitors brake pipe pressure and supplies pressure to or removes pressure from a brake cylinder in response to a change in pressure in the brake pipe. The brake signal from the control valve usually flows through a proportioning valve which has some sort of load sensing device that either detects that a rail car is loaded or not (the load indication is either "on" or "off") or detects the degree to which the car is loaded (the indication is "variable").

There are generally two types of rail vehicle braking systems that sense and use the load in each vehicle or car of a train to adjust the amount of brake pressure applied to each car's brakes. The first type utilizes a load sensing lever or similar mechanical device that is external but integral to an empty/load device, as illustrated, for example, in U.S. Pat. No. 5,211,450 (1993) to Gayfer et al, which is herein incorporated by reference. The movement of the load sensing lever, coupled with the resulting piston action of the valve affects and determines the value of the brake signal that is sent to the brake cylinder. The problem with this type of mechanical sensing device is that when a rail car has a self-leveling mechanism installed, there is no change in the relative position of the car body to the truck assembly supporting the car body. Thus, this type of empty/load device will not sense a change in the actual loading of the car.

A second type of braking system also has a sensing mechanism that is integral to, in this instance, an empty/load variable proportioning valve. In this case, however, the pressure reading from an external air spring is fed directly into the proportioning valve which then uses the amount of load in the car to help determine the value or proportion of the brake signal that is applied to the brake cylinder. This principle is reflected on U.S. Pat. No. 4,421,360 (1983) to Newton and in U.S. Pat. No. 3,910,639 (1975) to Engle. Engle has its applicability restricted mainly to light rail or mass transit use on trains with a limited number of cars. Newton focuses on a system relating to the combined transportation of highway and rail vehicles.

The present invention is designed for applicability to all types of rail vehicles including transit, freight and highway/rail.

The present invention provides a brake assembly comprising a switch and a proportioning valve connected in parallel.

The switch part of the assembly could, if desired, comprise a pressure sensor port for receiving a pressure signal from the air spring. The switch also could have an input port for receiving a brake signal from the control valve and a brake cylinder port for sending the brake signal to the brake cylinder. The switch could also have a spring that is responsive to air spring pressure that causes the switch to connect or disconnect the switch's input port to its brake cylinder port. That connection occurs when the pressure signal from the air spring reflects a loaded car condition with the pressure signal possibly having a value in the range of at least 35–40 psi. If the value of the brake signal is less than 35 psi, the switch would be in the empty position and would not connect the switch's input port to its brake cylinder port.

The second part of the assembly is a proportioning valve, which is well known in the art. It could, if desired, comprise a control valve input port to receive a brake signal from the control valve. It also could have a brake cylinder output port to send a proportional brake signal to the brake cylinder. The proportioning valve, if equipped with a mechanical load bearing sensing element, such as a lever, has it disabled. When disabled, the proportioning valve is not sensitive to the rail car's load and thus proportions the brake signal it receives solely based on the value of that brake signal. The proportioning valve receives a brake signal from the control valve when the switch is in the empty position.

The device then sends a proportional brake signal from the brake cylinder output port to the brake cylinder.

This assembly can, if desired, be used as part of an overall rail car brake system by connecting the inventive assembly with a control valve, a brake cylinder and an air spring. The air spring provides a pressure signal that is used by the switch to determine whether or not a brake signal from the control valve will flow through the switch unproportioned to the brake cylinder.

The inventive brake system's switch and proportioning valve, supra, are comprised and function as previously described in the inventive brake assembly description above.

The brake system's control valve provides the brake signal that is sent to the brake cylinder either through the switch (when it is in the "loaded" position) or through the proportioning valve (when the switch is in the "empty" position).

An air spring, which can be a self-leveling support for the rail car, provides a pressure signal to the switch. When the pressure signal has a value in the range of at least 35–40 psi, the switch will move to the "loaded" position and the brake signal will flow through the switch directly to the brake cylinder. Otherwise, the brake signal flows through the proportioning valve to the brake cylinder.

The present invention could be utilized for retrofitting a proportional brake system and comprises the steps of: first, disabling the load sensing element of the proportioning valve; and second, inserting a switch in parallel between the control valve input port and the brake cylinder outport port of the system's proportioning valve. The switch is responsive to a pressure signal from an air spring that is part of the rail car's support system and also provides an empty/load brake system input. The switch is responsive to selected values of the pressure signal from the air spring to selectively connect a brake signal at its input port to its brake cylinder port thereby providing the brake signal to the system's brake cylinder.

The switch can, if desired, connect the brake signal to the brake cylinder when the pressure signal has a value in the range of at least 35–40 psi.

Other aspects of the present invention will become apparent from the following detailed description of the invention when considered in conjunction with the accompanying drawings.

DETAILED DESCRIPTION OF THE PREFERRED EMBODIMENT

Generally, the inventive system works as follows: a control valve, which senses brake pipe pressure, puts out a brake signal that feeds to a switch and to a proportioning valve assembly; an air spring which senses the actual load in the rail car (and is not "fooled" by any car leveling mechanism) puts out a pressure signal to the switch; when the pressure signal reaches a pre-selected psi value or falls in a pre-selected psi range, the switch is activated and connects the brake signal from the control valve directly to the brake cylinder; if the pressure signal is not sufficient to activate the switch, the brake signal flows to the proportioning valve which transmits a proportioned brake signal to the brake cylinder.

In addition to modifying existing braking systems, the present invention can be installed as original equipment or used to completely replace another system.

Figure 1:
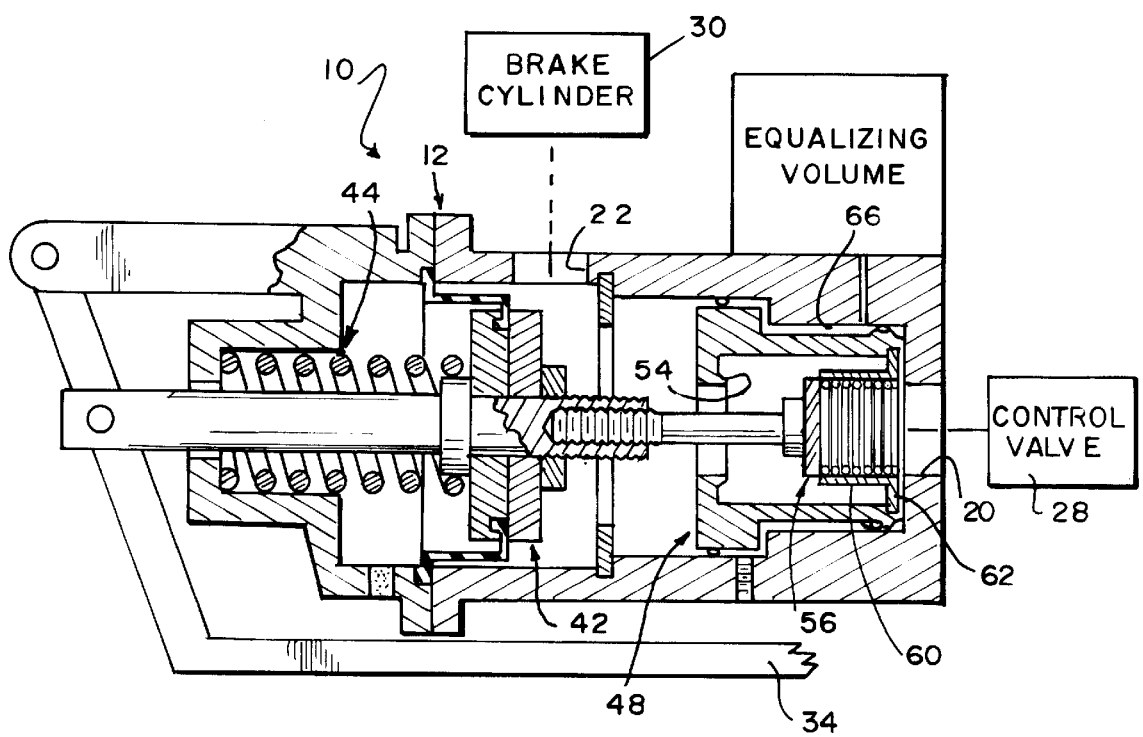
FIG. 1 is a cross-sectional view of a proportional brake valve empty/load device in the release position, shown as prior art.

An empty/load device 10 of the prior art is shown in FIG. 1. The device 10 is shown in the "release" position. There is no pressure on the control valve port 20, which allows the spring 44 to move the sensing piston 42 to the right forcing the valve element 56 and cage 60 into contact with retainer 62 forcing the ratio piston 48 into abutment with the interior end face of the bore 66. When control valve 28 provides a pressure at control valve port 20, valving element 56 is displaced from seat 54 and the brake cylinder port 22 is connected to the control port 20 through the ratio piston 48. A sensing lever 34 is secured to the body 12 and sensing piston 42 and operates to position the sensing piston 42 in response to load conditions on the rail car. If the car is loaded, the brake signal from the control valve 28 passes through the brake cylinder port 22 to the brake cylinder 30. If the car is empty, the ratio piston 48 proportions the brake signal. If the sensing lever 34 is disabled, the empty/load device 10 is not responsive to the vehicle's load and becomes a proportioning valve subject to a signal from the control valve 28. This empty/load device 10 is but one example explained in detail in U.S. Pat. No. 5,211,450.

Figure 2:
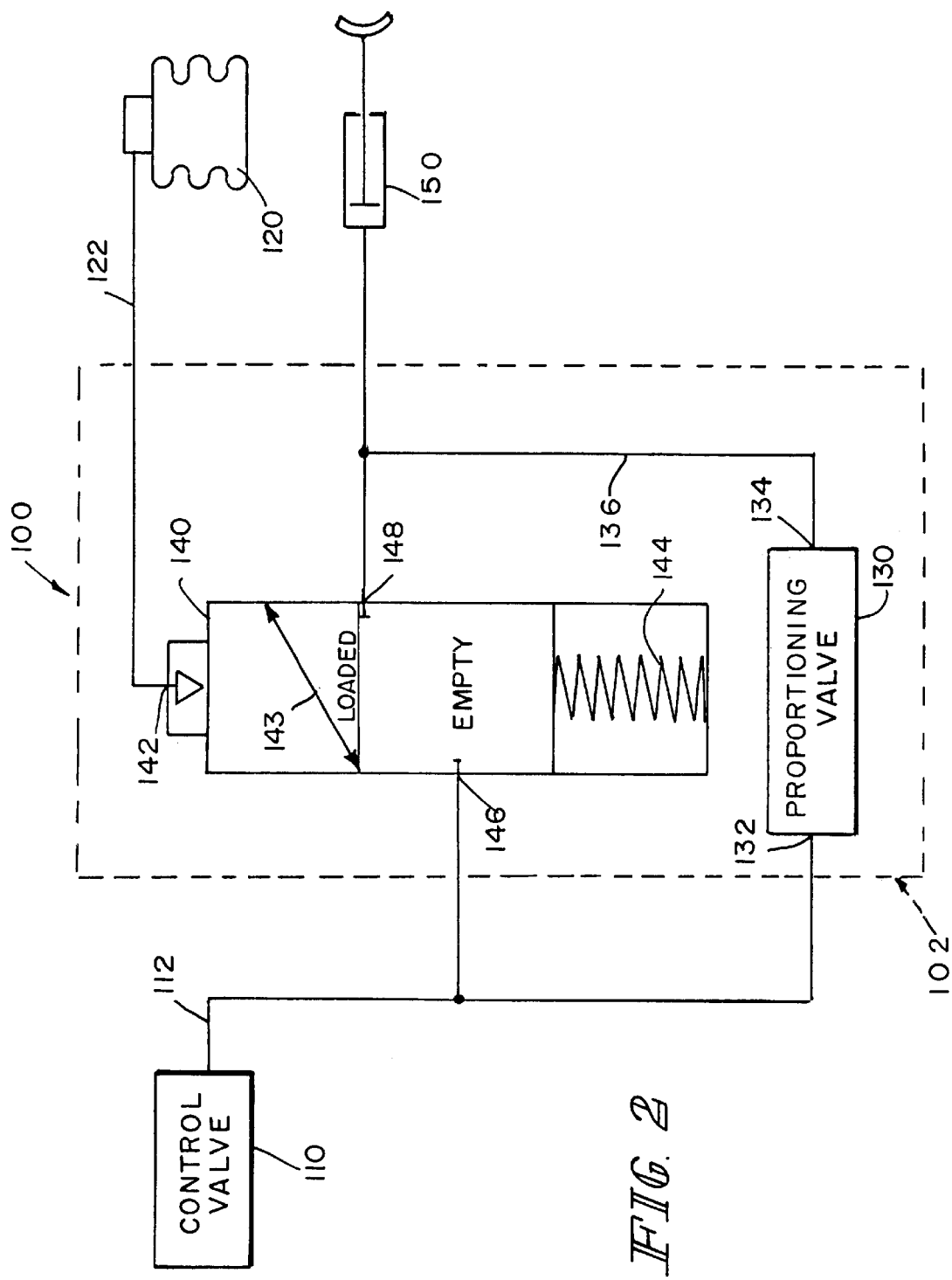
FIG. 2 is a block diagram of the brake assembly and system of the present invention.

The block diagram of FIG. 2 shows the invention wherein the brake system 100 is configured with the main components of a control valve 110, an air spring 120, a proportioning valve 130, a switch 140 and a brake cylinder 150. Switch 140 is shown in the empty position. When there is a light load in a rail car, reflected, for instance, by a pressure reading of less than 35 psi on the air spring 120, the pressure signal 122 that is detected by the pressure sensor port 142 in the switch 140 will not be sufficient to move the switch 140 against the spring 144. The switch will remain in its "empty position" and the input port 146 will not connect with the brake cylinder port 148 of the switch 140. The brake signal 112 generated by the control valve 110 will go directly to the control valve input port 132 of the proportioning valve 130. The proportioning valve 130 will proportion the brake signal and send a proportioned brake signal 136 through the brake cylinder output port 134 to the brake cylinder 150.

When there is a "heavy load" in a rail car, reflected, for instance, by a pressure reading of 35–40 psi on the air spring 120, the pressure signal 122 will be sufficient to move the switch 140 downwardly against the spring 144 into the "loaded" position and the input port 146 will connect with the brake cylinder port 148 through passageway 143. The brake signal 112 will therefore flow directly from the control valve 110 to the brake cylinder 150 without flowing through the proportioning valve 130 and will not be proportioned at all.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A brake assembly for a vehicle having an air spring wherein a brake signal operates a brake cylinder of the vehicle, comprising:

a proportioning valve having a load bearing sensing element that is disabled, an input port for said brake signal and a brake cylinder output port, and connected to and responsive to said brake signal to provide a proportioned brake signal from said brake cylinder to said brake cylinder output port; and a switch connected in parallel to the proportioning valve responsive to a pressure signal from said air spring to selectively connect said brake signal to said brake cylinder.

2. The brake assembly of claim 1 wherein said switch further comprises:

a pressure sensor port for receiving said pressure signal;

an input port for receiving said brake signal;

a brake cylinder port for providing said brake signal to said brake cylinder; and a spring responsive to said pressure signal to permit said switch to connect or disconnect said input port with said brake cylinder port.

3. The brake assembly of claim 2 wherein said switch connects said input port with said brake cylinder port only when said pressure signal exceeds a preset value.

4. The brake assembly of claim 3 wherein said preset value is in the range of at least 35–40 psi.

5. A brake system for a vehicle having an air spring, comprising:

a control valve providing a brake signal;

an air spring providing a pressure signal;

a brake cylinder;

a proportioning valve having a load bearing sensing element that is disabled, an input port for said brake signal and a brake cylinder output port, and connected to and responsive to said brake signal to provide a proportioned brake signal from said brake cylinder to said brake cylinder output port; and a switch responsive to said pressure signal from said air spring to selectively connect and disconnect said brake signal to said brake cylinder.

6. A brake system of claim 5 wherein said pressure signal is responsive to a load condition of a rail car.

7. The brake system of claim 6 wherein said switch further comprises:

a pressure sensor port for receiving said pressure signal;

an input port for receiving said brake signal;

a brake cylinder port for sending said brake signal to said brake cylinder; and a spring responsive to said pressure signal to permit said switch to connect or disconnect said input port with said brake cylinder port.

8. The brake system of claim 7 wherein said switch connects said input port with said brake cylinder port only when said pressure signal exceeds a preset value.

9. The brake system of claim 8 wherein said preset value is in the range of at least 35–40 psi.

10. The brake system of claim 6 wherein said air spring is self-leveling.

11. A method for retrofitting a brake system which includes a proportioning valve having a load bearing sensing element, a control valve input port and a brake cylinder output port; a control valve that provides a brake signal; an air spring that provides a pressure signal; and a brake cylinder, the method comprising the steps of:
  disabling said load sensing element of the proportioning valve; and
  inserting a switch in parallel between said control valve input port and said brake cylinder output port of said proportioning valve wherein said switch is connected to and responsive to said pressure signal to selectively connect said brake signal at the input port to said brake cylinder port in response to selected values of said pressure signal thereby directly providing said brake signal to said brake cylinder.

12. The method of claim 4 wherein said switch connects said brake signal to said brake cylinder when said pressure signal exceeds a preset value.

13. The method of claim 12 wherein said preset value is in the range of at least 35–40 psi.

14. The method of claim 11 wherein said pressure signal is responsive to a load condition of a rail car.

15. The method of claim 14 wherein said switch connects said brake signal to said brake cylinder when said pressure signal exceeds a preset value.

16. The method of claim 15 wherein said preset value is in the range of at least 35–40 psi.

* * * * *